United States Patent [19]

Saad et al.

[11] Patent Number: 4,900,928

[45] Date of Patent: Feb. 13, 1990

[54] PROCESS AND APPARATUS FOR DETERMINING QUANTITY OF RADIOACTIVE MATERIAL IN A CENTRIFUGE

[75] Inventors: Masoud Saad, Offenbach; Bernd D. Hahn, Springe, both of Fed. Rep. of Germany

[73] Assignee: Deutsche Gesellschaft fur Wiederaufarbeitung von Kernbrennstoffen mbH, Hanover, Fed. Rep. of Germany

[21] Appl. No.: 242,046

[22] Filed: Sep. 8, 1988

[30] Foreign Application Priority Data

Sep. 12, 1987 [DE] Fed. Rep. of Germany ....... 3730675

[51] Int. Cl.$^4$ .................... G01T 1/167

[52] U.S. Cl. .................... 250/336.1; 250/357.1

[58] Field of Search .................... 250/357.1, 336.1

[56] References Cited

U.S. PATENT DOCUMENTS

| | | | |
|---|---|---|---|
| 4,522,620 | 6/1985 | Leister | 494/10 |
| 4,591,720 | 5/1986 | Fuji et al. | 250/362 |
| 4,769,133 | 9/1988 | Brookes et al. | 210/86 |
| 4,777,367 | 10/1988 | Kawasaki et al. | 250/336.1 |

FOREIGN PATENT DOCUMENTS

| | | | |
|---|---|---|---|
| 2552568 | 7/1976 | Fed. Rep. of Germany . | |
| 3301113 | 7/1984 | Fed. Rep. of Germany . | |
| 3241624 | 6/1986 | Fed. Rep. of Germany . | |
| 3522126 | 1/1987 | Fed. Rep. of Germany . | |
| 3622886 | 1/1987 | Fed. Rep. of Germany . | |
| 3730675 | 3/1989 | Fed. Rep. of Germany . | |
| 55-71964 | 5/1980 | Japan | 250/357.1 |

OTHER PUBLICATIONS

U. L. Upson, R. E. Connally and M. B. Leboeuf, "Analyzing for Low-Energy Gamma Emitters in a Radioactive Mixture." *Nucleonics*, vol. 13, No. 4 (Apr. 1955), pp. 38–41.

*Primary Examiner*—Constantine Hannaher
*Attorney, Agent, or Firm*—Allegretti & Witcoff, Ltd.

[57] ABSTRACT

To determine the quantity of filling and/or loading of the drum of a clarifying centrifuge loaded with radioactive fluids from nuclear power plants, and to determine the burn-off, the gamma rays from the fluids are measured spectroscopically. From the gamma spectrum for one or several nuclides present in said fluids, the gamma line is evaluated to quantitatively determine the filling and/or loading quantity. The amount of the fluid supplied is preferably determined by means of the gamma spectrum of cesium 137/134. The sedimented solid portions, are preferably determined by means of the gamma spectrum of rhodium 106. To measure the burn-off, the gamma radiation of cesium and/or cerium is spectroscopically measured during the initial filling phase of the drum, the measuring phase lying between the beginning of the filling and the beginning of sedimentation.

10 Claims, 2 Drawing Sheets

PROCESS AND APPARATUS FOR DETERMINING QUANTITY OF RADIOACTIVE MATERIAL IN A CENTRIFUGE

BACKGROUND OF THE INVENTION

The invention concerns a process and device for determining the filling and/or loading of the drum of a clarifying centrifuge loaded with radioactive fluids from nuclear power plants, and for determining the burn-off of fuel elements.

PRIOR ART

A device for the treatment of radioactive waste water from nuclear power plants is described in DE-OS No. 35 22 126, in which the waste waters are treated in a clarifying filter centrifuge, which is monitored against overloading by means of a fill-level measuring probe operating in a contact-free manner.

A process and a device for determining the solids loading of the drum of a centrifuge are known from DE-PS No. 32 41 624. The centrifuge drum and a supplemental body connected with the drum are set into natural oscillation, and the frequency of the natural oscillations dependent on the solids load, or a value which can be derive from the frequency, is then measured.

DE-OS No. 25 52 568 concerns a device for signalling the maximum permissible sludge space of the rotating drum of a separator. The position of the phase boundary between the media to be separated in the separator drum is determined by means of light barriers.

DE-OS No. 33 01 113 concerns a process and a device for separating the media. The phase boundary of the media to be separated is determined in a transition area with several scanning ranges with the help of several discrete inquiry beams, which can, for example, be light rays.

DE-OS No. 36 22 886 discloses a centrifuge for removing solids from liquids, for example, of solid fission products from dissolved nuclear fuel. The quantity of solids is determined with the help of a power-measuring sample device, which makes it possible to weigh the drum of the centrifuge and its contents during operation.

It is already known to calculate the burn-off of fuel elements from the gamma spectrum of fission products. A fuel element to be examined is placed in a lead-shielded measuring chamber, clamped there on its ends in a positioning device, and is progressively led past a lead collimator and a detector ("Messung des Abbrandes bei Nulleistungsversuchen durch Gamma-Spektrometrie" [/="Measurement of Burn-Off in Zero-Power Experiments by Means of Gamma Spectrometry", by J. Knot, et al., in Atomkernenergie [/=Nuclear Energy/], volume 13 (1980, pages 67–71). It is disadvantageous in these known processes that the burn-off measurement can be distorted by the specific geometry of the fuel element. Furthermore, this type of burn-off measurement entails relatively great expense.

THE INVENTION

The object of the present invention is to provide a novel process and apparatus for economically measuring the filling and/or loading of a centrifuge charged with radioactive fluids from nuclear power plants, as well as for determining the burn-off of fuel elements. In this specification, "loading" refers to the solid or sediment portion of the radioactive fluids, while "filling" refers to the total filling of the drum.

This object is accomplished by spectroscopically measuring the gamma radiation emitted from the fluids and solids in the radioactive materials and quantitatively evaluating the gamma spectrum for one or several nuclides to determine the specific filling or loading quantity. In a preferred form of the invention, the amount of fluid is measured by sensing the gamma line of cesium 137/134 dissolved in the radioactive fluid. The amount of solids is determined by measuring the gamma line of rhodium 106 formed from ruthenium 106 in the solid portion of the fluid.

By means of the process in accordance with the invention, the filling and/or loading can be determined without contact with the centrifuge, which, for technical process reasons and from the viewpoint of safety, is a great advantage. The measurement of the gamma activity can take place with the help of gamma spectrometers of the type that is commercially available. The process is sufficiently precise.

The process can also be advantageously used to determine the burn-off of the fuel elements. This is accomplished by measuring spectroscopically the gamma radiation of the fluids and/or solids during the period between the time when the radioactive material is first charged into the centrifuge drum and the time when the separation of the solids begins. This makes possible, for example, a verification of the corresponding operating data. The special geometries of the fuel element cannot distort the measurement of the burn-off. It is particularly advantageous that the burn-off measurement can be carried out during the reprocessing of burned-off fuel elements, in the clarifying process of the fuel solution which is carried by means of the clarifying centrifuge. Additional devices for the handling of the fuel rods can be dispensed with.

The device used for carrying out the process is sturdy and little susceptible to breakdown.

THE DRAWINGS

Other objects and advantages will become apparent from the detailed description when read in conjunction with the accompanying drawings in which FIG. 1 is a sectional view through a centrifuge and a sensing device (shown schematically) associated therewith for detecting gamma radiation and evaluating the spectra of predetermined nuclides.

FIG. 2 is a graph showing the activity of the radioactive material during the various processing phases of the operating centrifuge (activity versus time).

DETAILED DESCRIPTION

Figure 1:
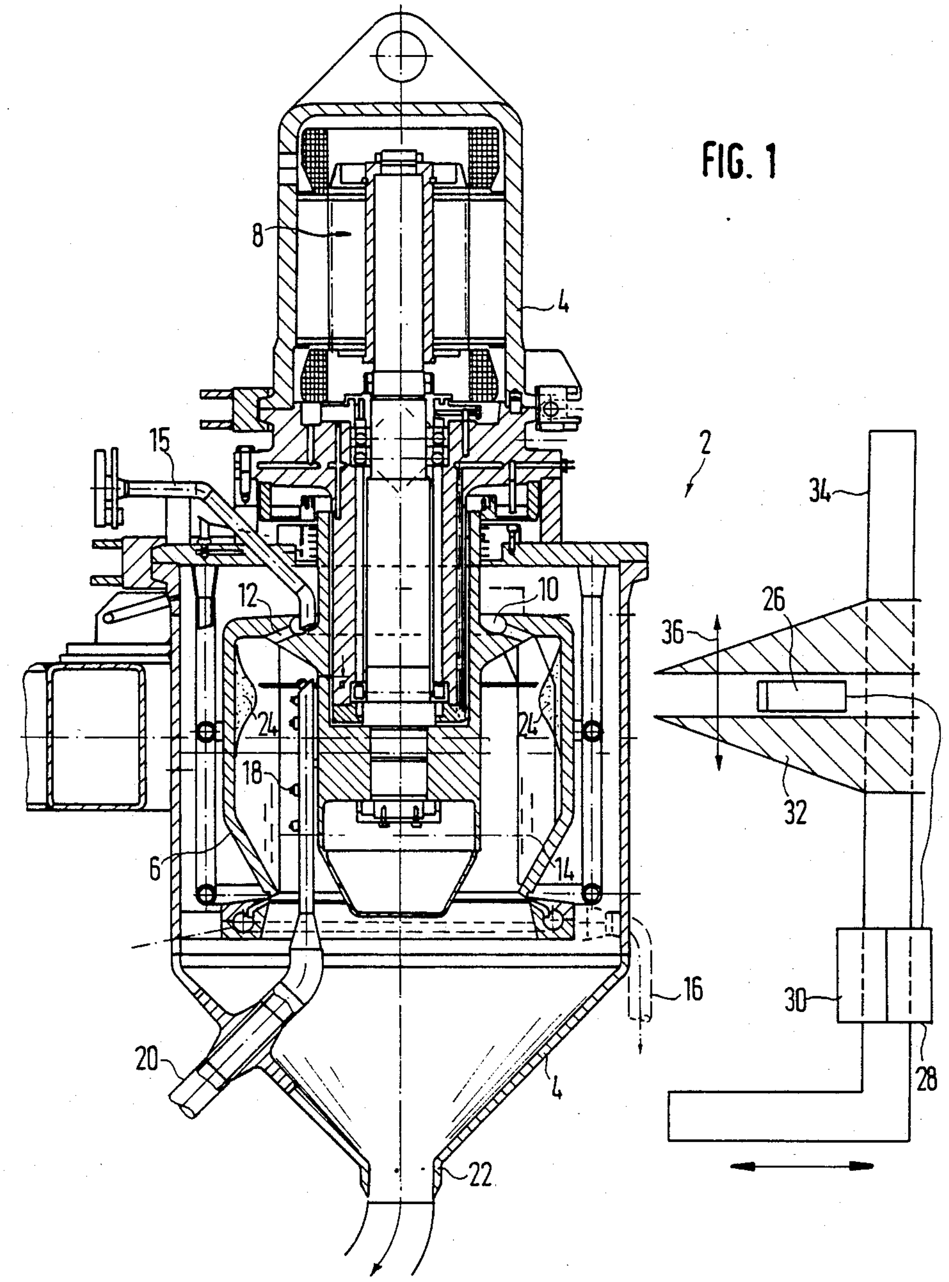

FIG. 1 depicts clarifying centrifuge 2 in cross-section, having a lower housing member 4 and a drum 6, which is driven by a motor 8. The drum has an annular groove 10 on its upper side, for receiving waste water from a nuclear power plant through feed pipe 15. The groove 10 is connected to the interior 14 of the drum by means of bores 12 directed upwardly.

An outlet pipe 16 is provided for the clarified fluids portion of the radioactive fluid being discharged from the drum.

A solids portion or sediment depositing on the internal wall of the drum and forming a cake 24 is rinsed out with water flowing through a rinsing pipe 20 equipped with spray nozzles 18. The solids flow with the rinse water downwardly out of the housing 4, through an outlet connection 22. When rinsing out the separated or sedimented solids, the rotational speed of the drum is sharply reduced, whereby the greatest portion of the fluid found in the drum again reaches the fluids collecting channel, and can flow out through the outlet pipe 16.

A detector 26 comprising part of a gamma spectrometer 28 is positioned adjacent the drum and connects to an evaluating unit 30, preferably a so-called "intelligent computer", to determine the quantities of fluids supplied (total fill) as well as the quantity of the separated solids portion (load) and/or the fluids portion from the absorbed gamma lines. These elements are all commercially available.

The detector is located behind a lead collimator 32 and is preferably constructed in such a manner that it can be moved vertically (see arrow 36) along the drum on a support 34 or the like. Several detectors (not shown) can also be provided which are preferably positioned above one another alongside the drum, and are also constructed in a movable manner.

The radioactive fluid supplied contains as its solids portion, among others, dissolved cesium 137/134, cerium 144, and rhodium 106, which is formed from ruthenium 106. The composition of the waste fluids as well as the relative quantities of the components are known in the art. During the loading of the clarifying centrifuge, the fluid quantity supplied can thus be determined by measuring and evaluating the Cs-gamma lines with the aid of the spectrometer 28 and the evaluating computer 30.

As soon as the solids separate, the rhodium 106 gamma line in the gamma spectrum grows. Since the solids portion consists of up to approximately 40% rhodium 106, it is possible, by evaluating the gamma lines, to determine the quantity of separated rhodium 106, and then, from that, the quantity of separated solids.

The specific gamma lines are evaluated in the known manner as regards the peak height and peak area in order to determine the specific nuclide quantities.

During a constant loading of the centrifuge with radioactive fluid and the removal of the clarified portion through the outlet pipe 16, the cesium (Cs) is also removed. The Cs-gamma lines thereby become, with increasing sedimentation of the solids portion, relatively smaller, while the gamma line of rhodium (Rh), because of the growth of the solids cake 24, becomes greater.

Instead of cesium and/or rhodium, other nuclides present in the radioactive fluid can be evaluated spectroscopically in the same way.

Figure 2:
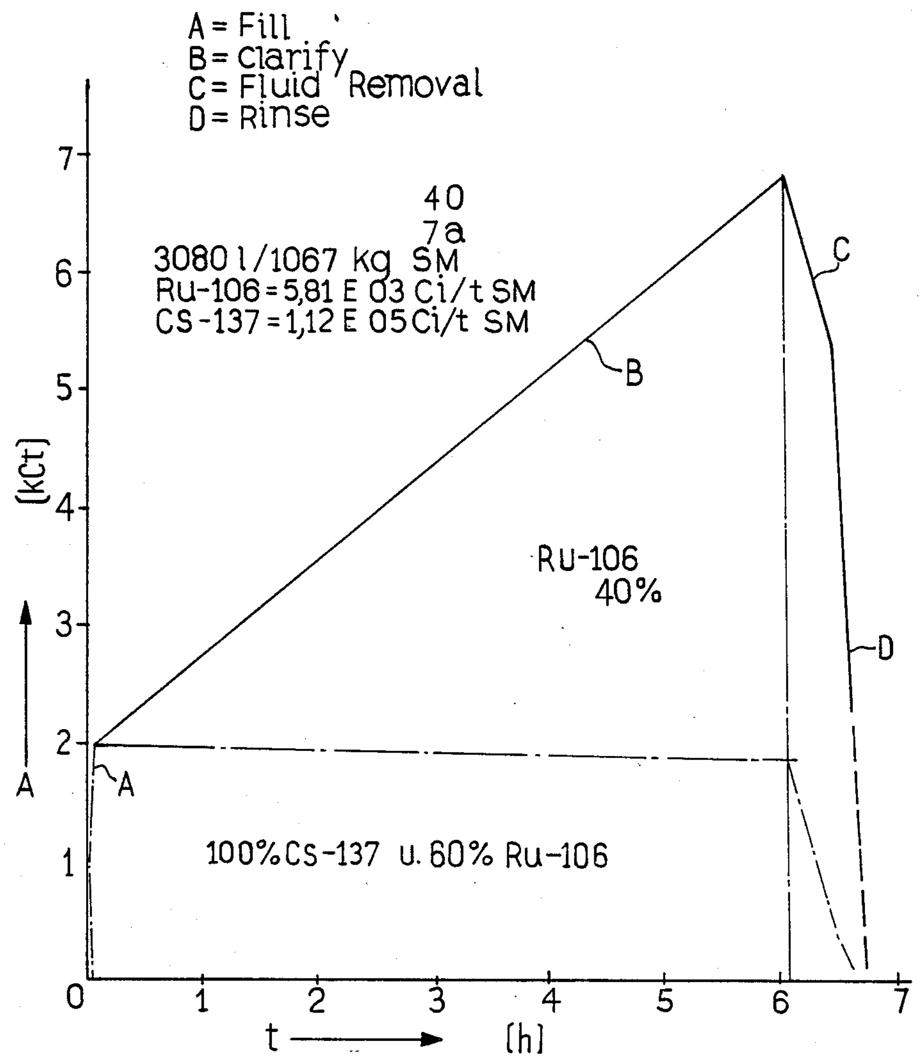

FIG. 2 depicts the course of a filling/loading measurement of a clarification centrifuge 600. The measuring data and parameters can be inferred from FIG. 2. The capacity of drum 6 is about 49 liters. Initially, the activity rapidly increases corresponding to the supplied quantity of radioactive waste fluid up to the complete filling of the drum (Curve A). Cesium 137/134 and cerium 144 remain in solution. Through the continuous measurement of, for example, the gamma spectrum of cesium, a calculation can be made of the fluids quantity supplied.

Curve B indicates the increase in radioactivity with time as the filling continues at a rate of 1,000 liters/hour. Two charges equal 1067 Kg of heavy metals. Rhodium 106 separates out of the fluid as a sediment. It can be seen that the total activity increases through the cakes of sediment which are forming, while the activity attributable to the fluids portion remains practically uniform, falling only slightly, specifically, by approximately 5% at maximum loading, after a clarification time of approximately 6 hours (FIG. 2).

When after the termination of the clarifying process, 37 liters of fluid are removed, the activity reduces correspondingly as shown by Curve C, FIG. 2.

Curve D depicts the rapid reduction of activity during the subsequent rinsing phase, in which the sedimented cake of feed sewage sludge is rinsed out of the drum with 10 liters.

The process described above and the device described above also are suited for determining the burn-off of the fuel elements.

To determine the burn-off, during the initial loading or filling phase (curve A of the diagram of FIG. 2), the gamma spectrum of cesium and/or cerium is recorded with the aid of the spectrometer 28. The intelligent computer 30 then determines the peak height and peak area from the gamma lines of the gamma spectrum, and calculates from these values the burn-off in the manner well known by those skilled in the art. In FIG. 2, Light Water Reactor Fuel:
40 Gigawatt day/ton burn-off, 7 hours cooling time;
3080 liters/1067 Kg of separated heavy metals
Ru-106 = 5.81 EO3 Curie/ton heavy metal
Cs-137 = 1.12 EO5 Curie/ton heavy metal.

We claim:

1. A process for determining the filling and loading of the drum of a clarifying centrifuge being charged with radioactive waste fluids of nuclear facilities comprising
measuring spectroscopically the gamma radiation of said fluids/solids contained in said fluids;
quantitatively determining from said spectroscopic measurement the gamma spectrum for at least one nuclide present; and
calculating from said gamma spectrum of said nuclide the quantity of filling and/or loading of said drum.

2. The process of claim 1 in which said measuring step is performed by measuring the peak height and peak area of the gamma lines.

3. The process of claim 2 in which the gamma line of cesium 137/134 dissolved in said waste fluid is evaluated to determine the total quantity of filling/loading being charged with said drum.

4. The process of claim 2 in which the gamma line of rhodium 106, formed from ruthenium 106 contained in said solids is evaluated to determine the quantity of said solids.

5. The process of claim 2 in which the gamma line of cesium 137/134 in said waste fluids and the gamma line of rhodium 106 in said waste solids are evaluated simultaneously.

6. The process of claim 1 in which said measuring step is carried out between the beginning of the charging of the waste material and the beginning of the separation of said solids from said material, and said gamma spectrum is evaluated to determine burn-off.

7. The process of claim 6 in which the gamma spectrum of cesium is measured.

8. The process of claim 6 in which the gamma spectrum of cerium is measured.

9. A device for carrying out the process of claim 1 comprising in combination with said clarifying centrifuge having a drum
a gamma spectrometer having a detector positioned beside said drum for detecting gamma radiation computer evaluating means (a) for determining the peak height and peak areas of the lines of the gamma spectra of specific predetermined nuclides in the waste water; and (b) also for determining from said height and area values the load quantity of waste material charged into the drum and the burn-off of the fuel elements.

10. The device of claim 9 in which said detector is vertically movable along the side of said drum.

* * * * *